US008433888B2

(12) United States Patent
Maruyama et al.

(10) Patent No.: US 8,433,888 B2
(45) Date of Patent: Apr. 30, 2013

(54) NETWORK BOOT SYSTEM

(75) Inventors: Shin Maruyama, Kyoto (JP); Masahiro Kozuka, Ishikawa (JP)

(73) Assignee: Co-Conv, Corp. (JP)

( * ) Notice: Subject to any disclaimer, the term of this patent is extended or adjusted under 35 U.S.C. 154(b) by 470 days.

(21) Appl. No.: 12/744,661

(22) PCT Filed: May 5, 2008

(86) PCT No.: PCT/JP2008/058439
§ 371 (c)(1),
(2), (4) Date: Jun. 30, 2010

(87) PCT Pub. No.: WO2009/069326
PCT Pub. Date: Jun. 4, 2009

(65) Prior Publication Data
US 2010/0299512 A1 Nov. 25, 2010

(30) Foreign Application Priority Data
Nov. 26, 2007 (JP) .................................. 2007-303953

(51) Int. Cl.
*G06F 15/177* (2006.01)
(52) U.S. Cl.
USPC .............................................. 713/2; 709/222
(58) Field of Classification Search ....... 713/2; 709/222
See application file for complete search history.

(56) References Cited

U.S. PATENT DOCUMENTS

| 5,563,945 | A | * | 10/1996 | Gercekci ....................... 713/190 |
| 5,802,297 | A | | 9/1998 | Engquist |
| 6,954,852 | B2 | * | 10/2005 | Burokas et al. .................... 713/2 |
| 7,191,344 | B2 | * | 3/2007 | Lin et al. ........................ 713/193 |
| 7,454,653 | B2 | * | 11/2008 | Nicholson et al. ............ 714/47.2 |
| 7,921,240 | B2 | * | 4/2011 | Zur et al. ......................... 710/52 |
| 2004/0153694 | A1 | * | 8/2004 | Nicholson et al. ................. 714/4 |
| 2005/0114659 | A1 | * | 5/2005 | Klein ............................. 713/165 |
| 2006/0090069 | A1 | * | 4/2006 | Burokas et al. ............... 713/163 |

FOREIGN PATENT DOCUMENTS

| EP | 752660 A1 | 8/1997 |
| JP | 9-34825 A | 2/1997 |
| JP | 2005149334 A | 6/2005 |

OTHER PUBLICATIONS

International Search Authority (ISA/JPO); International Search Report mailed Jun. 17, 2008 for International Application PCT/JP2008/058439; 4 pages.
Dinah McNutt et al., "Daemons & Dragons (85) Cache File System no Riyoho", Unix Magazine, Mar. 1, 1997, pp. 95-98, vol. 12, No. 3, Ascii Corp.
Dinah McNutt et al., "Daemons & Dragons (86) AutoClient no Donyu", Unix Magazine, Apr. 1, 1997, pp. 59-61, vol. 12, No. 4, Ascii Corp.
Dinah McNutt et al., "Daemons & Dragons (85) Cache File System no Riyoho", Unix Magazine, Mar. 1, 1997, pp. 95-98, vol. 12, No. 3, Ascii Corp.—Reference previously submitted on May 25, 2011 and English translation submitted herewith.
Dinah McNutt et al., "Daemons & Dragons (86) AutoClient no Donyu", Unix Magazine, Apr. 1, 1997, pp. 59-61, vol. 12, No. 4, Ascii Corp.—Reference previously submitted on May 25, 2011 and English translation submitted herewith.

* cited by examiner

*Primary Examiner* — Chun Cao
(74) *Attorney, Agent, or Firm* — Beem Patent Law Firm (57) ABSTRACT

To minimize network access to a server in a network boot system. A server which stores an OS operating on a client terminal and a client terminal which includes a physical storage device are connected to each other over a network. The client terminal includes a physical memory and a network interface, and the OS includes a network driver for driving the network interface, a filter driver for converting access to a local bus of the client terminal into access to the network, and a read cache driver for driving the storage device. The read cache driver caches data which is read out from the server by the filter driver in the storage device.

8 Claims, 6 Drawing Sheets

21a (Local Disk)

FIGURE 3A 22a (vDisk)

| swap | Vdisk Cache (Read/Write cache) | work area |

※ P2 AND P3 ARE INVISIBLE FROM OS

FIGURE 3C (a)

CACHE MANAGEMENT TABLE

| TYPE OF STATE FLAG | VALUE OF STATE FLAG | |
|---|---|---|
| READ MANAGEMENT FLAG | 0 (NOT READ YET) | 1 (ALREADY READ) |
| WRITE MANAGEMENT FLAG | 0 (NOT WRITTEN YET) | 1 (ALREADY WRITTEN) |

FIGURE 4A (b)

PROCESSING OF READ REQUEST SIGNAL

| STATE | | OPERATION |
|---|---|---|
| (I) | (R, W) =(0, 0) | CACHE DATA UNAVAILABLE (NO DATA) |
| (II) | (R, W) =(1, 0) | CACHE DATA AVAILABLE |
| (III) | (R, W) =(1, 1) | CACHE DATA UNAVAILABLE (DATA HAS BEEN UPDATED) |
| (IV) | (R, W) =(0, 1) | CACHE DATA UNAVAILABLE (WRITING HAS BEEN ALREADY PERFORMED) |

NETWORK BOOT SYSTEM

This application is a U.S. national stage application of PCT application PCT/JP2008-058439, filed May 5, 2008, and claims the benefit of priority from Japanese patent application 2007-303953, filed Nov. 26, 2007.

BACKGROUND OF THE INVENTION

1. Field of the Invention

The present invention relates to a system which boots an operation system over a network.

2. Description of the Related Art

A system (hereinafter referred to as a "network boot system") which boots an operating system (hereinafter referred to as an "OS") over a network has received attention in recent years. The system is composed of at least one network boot server (I/O server) and a plurality of client terminals connected over a network. Several types of system configurations are available as candidates for the system. The most common one is such that all programs and data such as an OS and application software operating on a client terminal are stored as image data in a storage device (e.g., a hard disk) on the server side and such that the OS is loaded onto the client terminal over a network when the client terminal is booted.

If a network boot system has a mechanism in which a plurality of client terminals share a storage device on the server side, each client terminal may be diskless, i.e., need not have a hard disk. The network boot system has the advantage of being able to manage all data including an OS of each client terminal in a centralized manner on the server side. The network boot system is thus suitable for a system in which a large number of client terminals operate.

Since an OS and application software are executed using a CPU and a physical memory of each client terminal, the network boot system also has the advantage of being able to maximize the performance of each client terminal and minimize server loads.

If n clients simultaneously access a server in this system, the throughput of the server simply decreases to 1/n. Loads produced by individual clients are temporally distributed in normal use, and the decrease does not pose a serious problem. For this reason, even if the number of client terminals to be simultaneously used increases, the network boot system in normal use delivers performance which is by no means inferior to, e.g., a general (not network boot) stand-alone computer system which boots its operating system by itself. Note that examples of a document related to the related art of the present invention include Japanese Patent Laid-Open No. 2005-149334.

SUMMARY OF THE INVENTION

The present inventors measured the traffic when a certain OS is booted to be about 120 Mbps. According to the result, since the communication speed of a network on the server side is about 1 Gbps at the most under the present circumstances, the upper limit of the number of client terminals for maintaining performance is estimated to be eight (1 Gbps/120 Mbps). That is, assuming a case where "a large number of client terminals are booted" in a network boot system, a deterioration in performance which is more serious than generally thought may occur.

The present invention has been made on the basis of the above-described findings, and has as its technical object to provide a new mechanism which allows a significant reduction in network access to a server.

In a network boot system according to the present invention, a network boot server which provides an operating system operating on a client terminal and a client terminal including a physical storage device are connected to each other over a network, the client terminal includes a physical memory which can temporarily store data necessary during boot-up of the operating system and a network interface for accessing the server over the network, the operating system includes a network driver for driving the network interface, a filter driver for converting access to a local bus of the client terminal into access to the network, and a read cache driver for driving the storage device, and the read cache driver read-caches data read out from the server by the filter driver on the storage device.

In this system, data on the server is generally stored as an image data. The term "read-caching" here refers to "caching for reading only," i.e., caching an unchanged copy of the image data in the storage device of the client terminal. Since, according to the system, the "read-caching" functions extremely effectively for the OS and application software operating on the OS, a speed equal to or higher than a local disk is achieved in terms of reading, and a boot-up speed is significantly improved. Additionally, there is little network access to the server at the time of boot-up for a second or subsequent time. As a result, the number of client terminals which can be connected to one server can be dramatically increased than ever before.

Preferably, the client terminal in this system holds, in the physical memory, a management flag for determining by the read cache driver whether the data read out from the server is in an already-written state, and the storage device includes a read cache area for holding data received from the server. This is because, of several possible methods for determining whether data is in an already-written state, the process of providing the management flag in the physical memory of the client terminal is the most simple and the fastest. Note that the term "management flag" alone refers to two management flags, a "write management flag" for determining whether writing is performed on an area of the server from which data is to be read and a "read management flag" for determining whether data read out from the server is already written to the physical storage device.

Note that since the contents of the physical memory are deleted after the OS of the client terminal ends, the contents of at least a part of the management flag are more preferably stored in order to use data held in the read cache area when boot-up is performed for a second or subsequent time. For this reason, the storage device preferably further includes a cache management area for writing back at least a part of the management flag held in the physical memory. This is because this configuration eliminates the need to obtain data already read out from the server after OS rebooting again over the network. The process of writing data back to the storage device is backup of the management flag and thus may be performed at any time. For example, the process may be performed asynchronously to reading and writing with the filter driver. Note that the expression "at least a part of the management flag" refers to a "read management flag."

The storage device may include a swap area for temporarily storing a part of data stored in the physical memory, a write cache area where data written to the server is allowed to be stored, a work area for application software operating on the operating system, and the like. This is because since this system provides a mechanism in which each client terminal locally has a storage device, and data is read-cached in the storage device, and the operating environment of the client terminal is further improved by using a part of the storage device for such purposes.

Preferably, the server comprises a virtual disk for holding an operating system, application software, and other data used by the client terminal, the virtual disk including an area for holding update information for the virtual disk, and this system is configured such that if the virtual disk is updated, all pieces of data cached in the storage device are not used. This system can be designed on the assumption that image data on the server side is not updated. In this case, since real storage of the virtual disk is a part of a storage device on the server side, it is convenient to manage update information of the virtual disk on the server side.

A part or a whole of the storage device is preferably encrypted. This is because the encryption can prevent data from being leaked even if a hard disk and the like on the client terminal side are taken away.

In a network boot system according to the present invention, a local disk of a client terminal includes a "read cache" as its part. Accordingly, network access does not occur at the time of reading out the same data for a second or subsequent time, and network access to a server can be dramatically reduced. Even if a failure occurs in a physical disk on the client terminal side, network access to the server does not increase rapidly unless similar failures occur simultaneously in other client terminals. The whole system does not suffer from a performance problem.

DETAILED DESCRIPTION OF THE PREFERRED EMBODIMENTS

Terms in this specification are to be interpreted in the manner below. Note that other terms not defined here will be pointed out later as needed.

The term "server" refers to at least one computer which provides an operating system operating on a client terminal. A server holds, as image data, a virtual disk containing an OS to be used by a client terminal, application software, and other data.

The term "virtual disk" refers to an image disk (which may be referred to as a "Vdisk") visible to an OS on a client terminal over a network. A virtual disk itself is a part of data stored in a physical disk on a server connected over a network.

The term "local" refers to a device connected to an internal bus of a client terminal without the mediacy of an external network such as a LAN.

The term "physical disk" refers to a storage device such as a hard disk which is connected to a local bus and is tangible. The storage device will also be referred to as a "local disk." Note that the type of a hard disk (e.g., a SCSI disk, an IDE disk, or a SATA) is not particularly limited as long as an OS can recognize the hard disk. Physical disks include all feasible storage devices which substitute for a hard disk, such as a semiconductor memory, regardless of whether the physical disks are disk-shaped.

The expression "user data and the like" refers to all data that are saved by an OS of a client terminal or application software operating on the OS when a user operates the client terminal.

The term "OS" alone without any specification refers to an OS operating on a client terminal. Additionally, "write (or read) request signals from the OS side" include a request signal which application software operating on the OS side issues toward a filter driver.

(Basic Principle of Network Boot System)

Figure 6A:
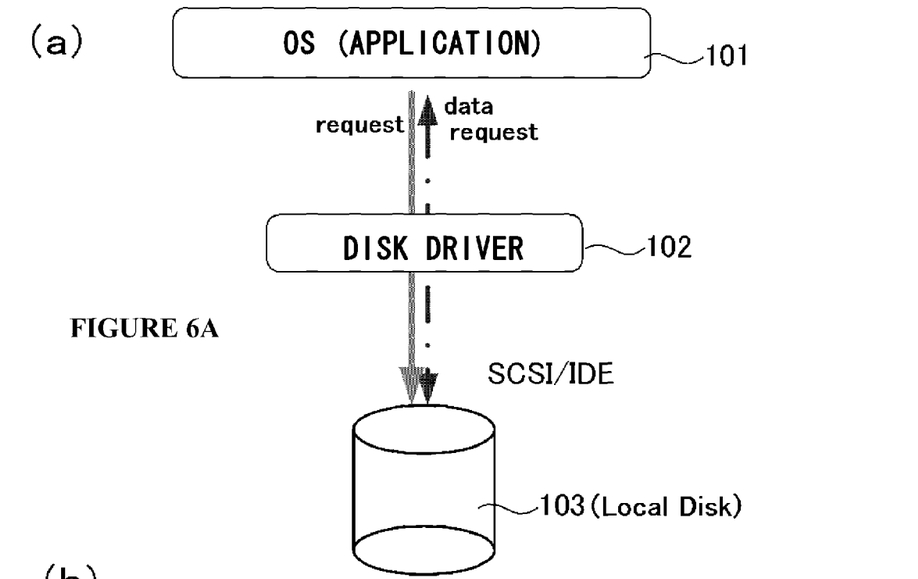
FIGS. 6(A) and 6(B) are each a diagram for explaining a disk access relationship in a general computer system.
Figure 6B:
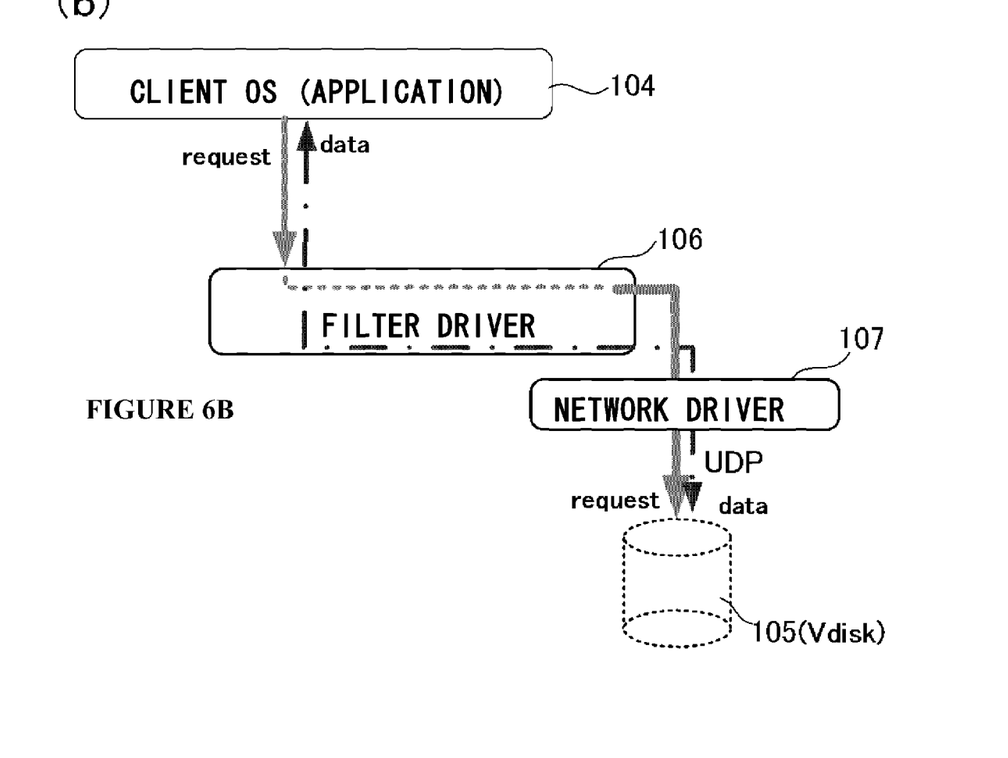

The basic principle of a general network boot system will be briefly described here. FIGS. 6(A) and 6(B) are each a diagram for explaining a disk access relationship in a general computer system.

FIG. 6(A) is a diagram for explaining a mechanism in which a general computer system reads and writes data from and to a local disk. When an OS or application software 101 on a client terminal sends read and write request signals to a local disk 103, a disk driver 102 controls reading and writing of data from and to the local disk 103 in accordance with the request signals.

FIG. 6(B) is a diagram for explaining a mechanism in which a network boot system reads and writes data from and to a virtual disk (Vdisk). When an OS or application software 104 sends read and write request signals to a virtual disk 105, a filter driver 106 first receives the request signals instead of a disk driver, transfers the request signals to a network driver 107, and controls reading and writing of data from and to a disk image whose real storage is on a server (the virtual disk 105) through a network interface (not shown).

As described above, the filter driver 106 of each client terminal converts access to the local disk into network access. With this conversion, a CPU of the client terminal accesses a disk image of the server instead of accessing the local disk.

A "filter driver" here is a type of device driver which operates on an OS on the client terminal side. A network driver is provided downstream from the filter driver. The network driver communicates with a virtual disk (Vdisk) on the server side through a network interface (e.g., an Ethernet card) and transfers data on the basis of a received request signal for disk access. That is, if the virtual disk receives a read request signal, it returns data to the client terminal side. On the other hand, if the virtual disk receives a write request signal, data is written to the virtual disk.

First Embodiment

A first embodiment of a network boot system according to the present invention will be described in detail below with reference to the drawings.

[1] Overall Configuration of System

Figure 1A:
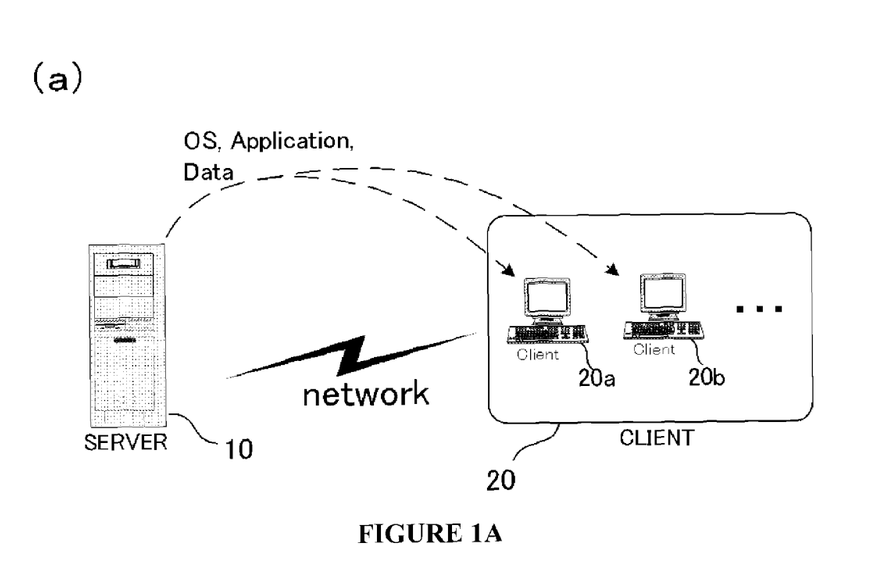
FIGS. 1(A) and 1(B) are conceptual views for explaining the basic configuration of a network boot system according to a first embodiment.
Figure 1B:
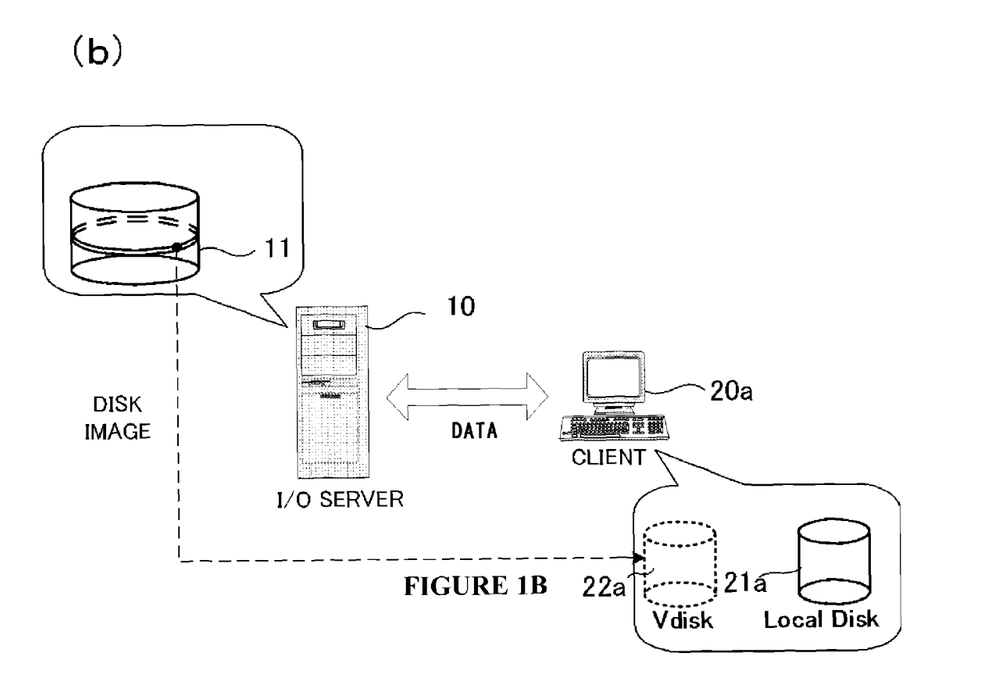

FIGS. 1(A) and 1(B) are conceptual views for explaining the basic configuration of the network boot system according to the first embodiment. As shown in FIG. 1(A), in the system, at least one server (network boot server) 10 and a plurality of client terminals 20 (20a, 20b, . . . ) are connected over a network. As shown in FIG. 1(B), the system server 10 includes a physical disk (e.g., a hard disk) 11. The system server 10 includes basic components of a server, such as a CPU and a memory (not shown), in addition to the physical disk 11. The client terminal 20a includes a local disk 21a. Note that a "client terminal without a local disk" may be included as a part of the whole system.

Disk images corresponding to the client terminals 20 (20a, 20b, . . . ) are stored in the physical disk 11 of the server 10. Note that this embodiment includes a case where the physical disk 11 holds a disk image common to all the client terminals and an update data for each client terminal. The disk image is mounted in an OS on the client terminal over the network. It seems to each client terminal that virtual disks 22 (22a, 22b, . . . ) are connected over the network (see FIG. 1(B)).

As described above, in the first embodiment of the present invention, each client terminal has both a virtual disk and a local disk.

Figure 2:
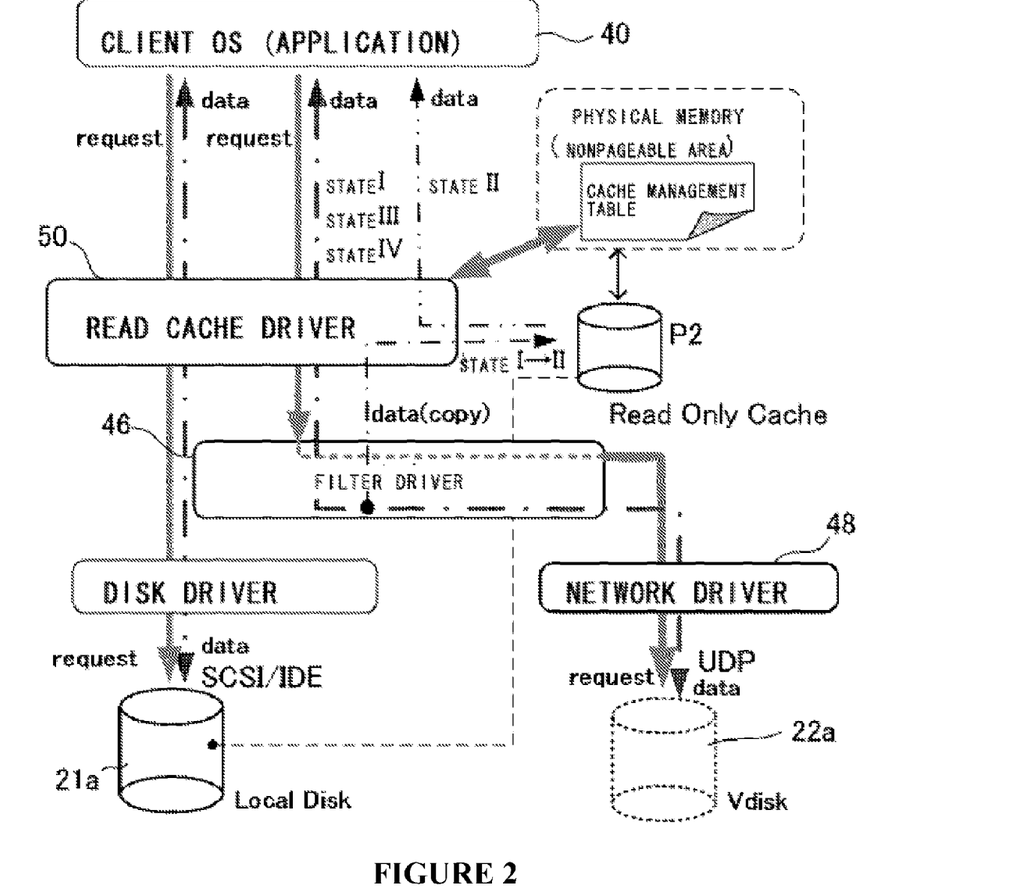
FIG. 2 is a diagram for explaining a disk access relationship in the system.

FIG. 2 is a diagram for explaining a disk access relationship in this system. As described above, each client terminal of the system has one local disk 21a and one virtual disk 22a. For this reason, the basic operation is such that access to the local disk 21a is gained through a disk driver via an internal bus (not shown) (e.g., a SCSI bus or an IDE bus) whereas access to the virtual disk 22a is gained through a filter driver 46 and a network driver 48 via the network.

The system also includes a "read cache driver 50" upstream from the filter driver 46. The read cache driver 50 accesses data in (writes data to and reads data from) a read cache area P2 assigned to a specific partition in the local disk 21a. The read cache driver 50 functions to read-cache data read out from the server by the filter driver 46 in the local disk. The details of the operation will be described in "[4] System Operation."

[2] Disk Configuration on Client Terminal Side

Figure 3A:
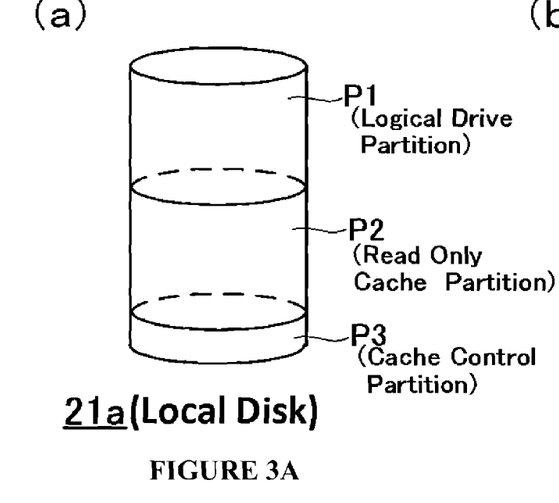
FIGS. 3(A) and 3(B) are each a diagram showing the disk configuration of a client terminal.
Figure 3B:
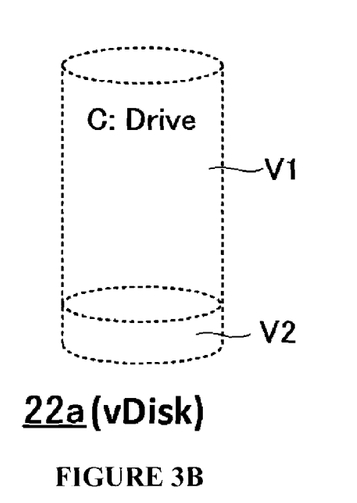

FIGS. 3(A) and 3(B) are views showing the disk configuration on the client terminal side. As shown in FIGS. 3(A) and 3(B), the client terminal includes the local disk 21a and the virtual disk (Vdisk) 22a.

As described above, a virtual disk is treated as a logical drive (which may also be referred to as a "network drive" depending on the OS) which seems to a client terminal to be located across a network. An OS system and user data can be stored as a disk image on the server side over the network as if they are stored in a local disk of a user. A physical hard disk of a client terminal (referred to as a "local disk") is directly connected to an internal bus.

(1) Configuration of Physical Disk

FIG. 3(A) is a diagram for explaining the configuration of a physical disk. The physical disk is the local disk directly connected to the client terminal side. In this embodiment, each physical disk is divided into at least three areas (partitions).

Figure 3C:
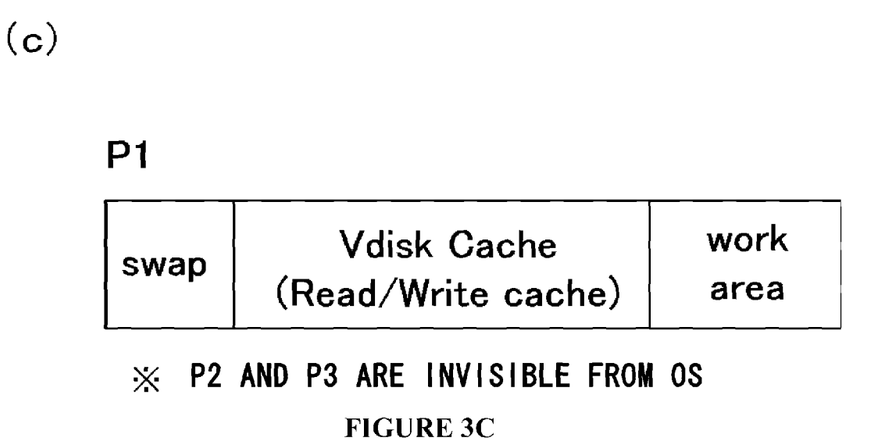
FIG. 3(C) is a chart for explaining an example of functions to be assigned to a first partition P1.

FIG. 3(C) is a chart for explaining an example of functions to be assigned to a first partition P1 and corresponds to descriptions (i) to (iii) below. Note that the first partition P1 is recognized as a logical drive or files and directories by an OS on the client terminal side whereas second and third partitions P2 and P3 are not recognized at the application level (e.g., as a logical drive or files and directories) but only at the physical level (e.g., as sectors or clusters) on the local disk.

(i) First Partition P1

A "swap area" of the OS on the client terminal side, a "write cache," and a "work area for application software operating on the client terminal side," and the like can be assigned to the first partition P1 of the physical disk as needed. Although the first partition P1 is not essential for the present invention, creation of the first partition P1 has the advantage of increasing the throughput of each client terminal.

a. Swap Area

The term "swap" refers to one of OS functions using a part of a local hard disk as a memory in order to compensate for a physical memory shortage in a client terminal. Swap operation refers to the operation of preparing a "swap area" on a hard disk, temporarily saving on the hard disk the contents of an area of a memory not in use when available memory becomes low, and writing the contents back to the memory as needed. A memory area beyond an actual memory capacity which is reserved using the function is referred to as a "virtual memory." If a client terminal is diskless, a swap area cannot be provided on the client terminal side. Data overflowing a memory are all sent to a swap area on the server side. This consumes resources of the server and causes imposition of network loads. However, each client terminal includes a local disk in the network boot system according to the present invention, and a swap area can be reserved at a part of a physical area. The prevention of swap operation on the server side over a network is a major advantage.

b. Write Cache

If a write request signal is sent from an OS or the like 40 on the client terminal side to the filter driver 46, write data is cached in a physical area of the local disk. The physical area can be used as a so-called "write cache." The "write cache" can also be used as a "read cache" (note that cached data read out as the "read cache data" includes data after writing of user data and the like). The write cache allows update information for the client terminal such as user data to be stored on the client terminal side and has the advantage of reducing network loads.

c. Work Area for Application Software

Assignment of a work area for application software operating on the client terminal side has the advantage of reducing network loads.

(ii) Second Partition P2

A "read cache area" is assigned to the second partition P2 of the physical disk. How to use the area P2 will be described in "[4] System Operation." It is important that data after writing never be stored in this area. In this context, the area is totally different in technical significance from the area described in "(i) b. Write Cache."

(iii) Third Partition P3

A "cache management area" is assigned to the third partition P3 of the physical disk. How to use the area P3 will be described in "[4] System Operation" (to be described later).

(2) Configuration of Virtual Disk

FIG. 3(B) is a diagram showing the configuration of the virtual disk. The virtual disk is recognized by the OS on the client terminal, and its real storage is a part of a hard disk on the server. In this embodiment, the whole of the virtual disk is divided into at least two areas (partitions). A first partition (indicated by "V1") is a logical drive (e.g., drive C) which is recognized by the OS on the client terminal side whereas a second partition (indicated by "V2") is an area which is not recognized by the OS on the client terminal side. Update history information of the virtual disk and the like are stored in the second partition V2. Each time a disk image is updated by a dedicated tool on the server, update information and the like are written by a program on the server side.

Note that since the amount of data of information such as an update history is extremely small, the size of the second partition V2 may be extremely small compared to that of the first partition V1. For example, if the size of the first partition is 15 to 30 GB, that of the second partition is set to about 1 MB.

In summary, drives whose presence can be confirmed on the OS by a user of the client terminal in this embodiment are a logical drive (e.g., C drive) corresponding to the first partition V1 of the virtual disk and some logical drives corresponding to the first partition P1 of the physical disk.

[3] Disk Configuration on Server Side

There are two ways to store a disk image in a disk on the server side: share mode and private mode. In share mode, one disk image common to all client terminals and a required number of pieces of write data (called "writeback cache data") for respective clients are stored. In private mode, the same number of disk images as client terminals are stored. The former mode has the advantage of high disk use efficiency. The latter mode has the advantages of allowing provision of different OSes for respective clients and use of one client terminal in different operating environments.

The network boot system according to the present invention can operate in either mode by changing settings on the client terminal side. That is, a mode change requires very few alterations to the configuration on the server side and can be implemented by changing the configuration on the client terminal side. The operation of the system will be described below.

[4] System Operation (1) Basic Operation of "Read Cache Driver"

First, the basic operation of a "read cache driver" will be described. Referring to FIG. 2, solid arrows pointing from the client OS (application) 40 toward the local disk 21a and the virtual disk 22a indicate read or write request signals (request signals). Upon receipt of the request signals, the device drivers communicate with the corresponding disks and transfer data. Alternate long and short dashed arrows adjacent to the request signals indicate data transfer. For example, if a read request signal is issued, data is read out from the disk side and is sent out to the OS side. On the other hand, if a write request signal is issued, data is sent out from the OS side to the disk side and is written to the corresponding disk.

The read cache driver is a program for performing "read-caching" of the read cache area (P2) of the local disk, and the operation is as described below.

(i) Processing of Read Request Signal

If the OS (or application software) 40 on the client terminal side sends out a "read request signal," the read cache driver 50 receives the "read request signal" ahead of the filter driver 46. In this case, the read cache driver 50 determines whether there is corresponding data stored in the "read cache area" assigned to the second partition P2 of the physical disk and whether, if there is corresponding data, the data is in an already-written state, using a "cache management table." If the data is not in an already-written state, the read cache driver 50 immediately returns the read cache data to the OS. If the read cache data is in an already-written state or if there is no corresponding read cache data, the read cache driver 50 sends the received "read request signal" to the downstream filter driver 46 without processing. Note that when the filter driver 46 receives the "read request signal," data is read out from the server side through the network driver 48, as usual.

(ii) Update of Read Cache Data

In case (i) described above, finally, the data read out from the server side passes through the filter driver 46 and the read cache driver 50 in this order and is sent out to the OS 40 side. At this time, the read cache driver 50 copies the data read by the filter driver 46 to the "read cache area" assigned to the second partition P2 of the physical disk and stores the fact that the read cache data is in an already-read state by changing a flag in the cache management table on a physical memory.

(iii) Processing of Write Request Signal

If the OS (or application software) 40 of the client terminal sends out a "write request signal," the read cache driver 50 receives the "write request signal" ahead of the filter driver 46. However, when the read cache driver 50 receives the "write request signal," it sends the "write request signal" to the downstream filter driver 46 without special processing. Note that when the filter driver 46 receives the "write request signal," it writes data to the server side through the network driver 48, as usual.

(2) Mechanism of "Cache Management Table"

Figure 4A:
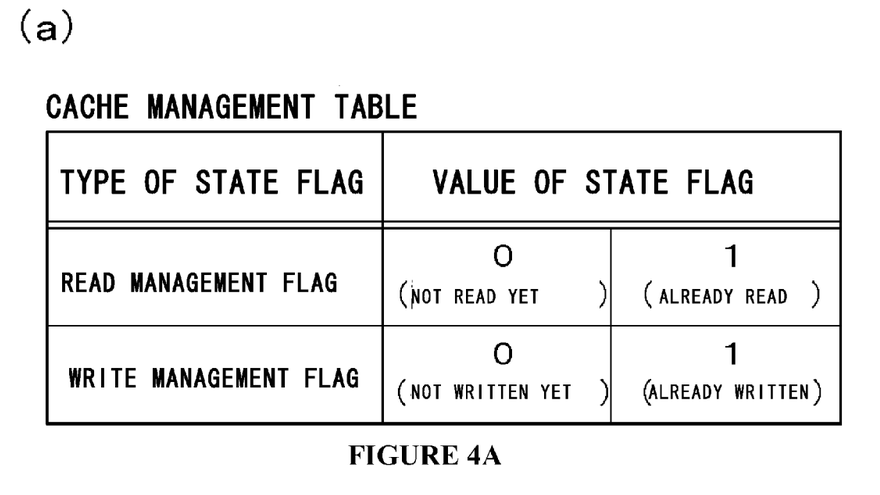
FIG. 4(A) shows a "cache management table.

FIG. 4(A) shows the "cache management table." In the cache management table, management flags of two bits are assigned to each read unit of the local disk (physical disk) to hold two values (states) to be described below. The management flags are retained in a nonpageable area (an area whose data is not saved on the swap area) on the physical memory.

(i) Management Flag

The "cache management table" stores the state of read cache data using two management flags. The flags are each initially set to 0.

a. Read Management Flag (0 or 1)
b. Write Management Flag (0 or 1)

(ii) If read cache data is absent, and data which is received by the filter driver as a response to a read signal from the OS is copied, data of the read management flag is changed from 0 to 1 in order to store the fact that the read cache data is in an already-read state. That is, a read management flag of 1 indicates that there is corresponding read cache data. However, whether the read cache data has been updated by writing after the copying cannot be determined only from the read management flag.

(iii) If the filter driver receives a "write request signal" from the OS, as described above, the read cache driver sends data to the filter driver without special processing, and the data is written to the virtual disk on the server side through a network interface. At this time, the state of the write management flag is changed from 0 to 1. That is, if the read management flag is 1, and the write management flag is 1, writing has been performed after the change of the read management flag to 1, and the contents of the read cache data have been changed from an initial state. The values of the management flags mean that the read cache data should not be used any more in response to a read request signal for a corresponding sector. After the write management flag is changed to 1, the state of the write management flag is maintained until the OS on the client terminal side is shut down. In other words, "whether data has already been written in a certain sector" can be determined by checking whether a "write request signal" for the sector has ever been received.

Figure 4B:
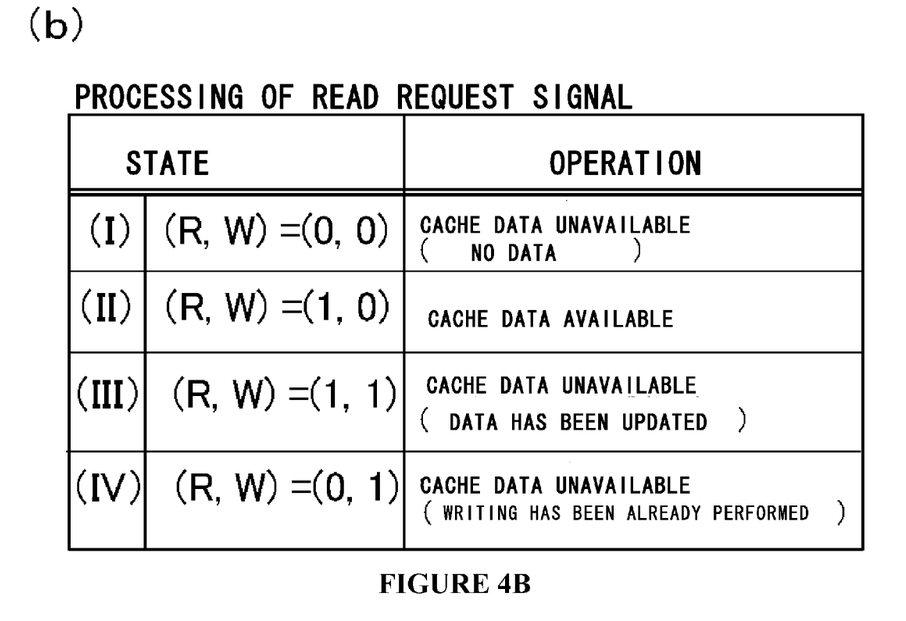
" and FIG. 4(B) is a chart showing a list of correspondences between states of the cache management table and associated operations.

FIG. 4(B) is a chart showing a list of correspondences between states of the cache management table and associated operations. State I is a state in which there is no corresponding read cache data. In this state, reading of data is delegated to the filter driver 46. When the filter driver 46 passes received data to the OS 40 side, the data is copied as the read cache data, the value of the read management flag is changed to 1, and transition to state II is made on the cache management table. State II is a state in which the read cache data is available. The contents of the read cache data are immediately returned in response to a read request signal. State III is a state in which the write management flag is 1 and indicates that the cache data is in an already-written state. Accordingly, the cache data held in a sector concerned should not be used any more. State IV is a state in which a write request signal is sent without a single read operation after boot-up of the OS. Since the write management flag is 1 in this case as well, the cache data held in the sector concerned should not be used any more. Note that each management flag always transits from state I to state II and from state II to state III or from state I to state IV, as will be described later.

As described in "(2) (i) b.," a cache area for holding already-written data may be further provided at a part of the local disk on the client terminal side by assigning a write cache to the first partition P1 of the physical disk, and network loads may be reduced by using the cache area as the write cache. Note that the write cache area (P1) needs to be different from the "read cache area (P2)" described above.

(iv) Backup of Cache Management Table

Since management flags are loaded into a nonpageable area (an area whose data is not saved on the swap area) of the physical memory, the contents of the flags are deleted when the OS is rebooted. In order to use read cache data after rebooting of the OS, the state of each read management flag before the rebooting of the OS needs to be held. To this end, the state of each read management flag is periodically backed up to the "cache management area" at the third partition (P3) of the physical disk. The backup operation may be performed asynchronously to data reading and writing with the filter driver. Note that even if a synchronization failure occurs (update occurs during a synchronization interval), use of read cache data for a sector concerned is abandoned, and processing is delegated to the downstream filter driver. This is because if a corresponding read management flag transits to state I, and reading from a disk image on the server side is performed again, data inconsistency does not occur for the read cache.

After boot-up of the OS, a "read management flag" and a "write management flag," two bits in total, are necessary for each read unit in the cache management table. For example, in the case of a SCSI disk, one sector equals 512 bytes. A two-bit physical memory is necessary for each unit of 512 bytes. However, since write management flags are all reset to 0 after rebooting, the "cache management area (P3)" for storing the state of the cache management table needs to store only the state of each read management flag. At least one bit of disk space per 512 bytes, i.e., a cache management area of 0.25 MB (megabytes) per read cache data of 1 GB (gigabyte) is necessary.

Note that, in actual operation, reliability is preferably enhanced by periodically and alternately writing data of each "read management flag" to at least two or more different spots in the cache management area in order to increase the use efficiency of read cache data. If an operation mode in which two backup copies are saved is adopted, the required size of the cache management area is 0.5 MB (megabytes) per read cache data of 1 GB (gigabyte). For example, if the read cache data area has a size of 30 GB (gigabytes), the required size is 15 MB (megabytes).

(v) Summary a. If a write management flag and a read management flag are both 0, there is no corresponding read cache data. Accordingly, the read cache driver 50 delegates processing of a read request signal from the OS 40 side to the downstream filter driver 46, copies data received by the filter driver 46 to the read cache partition (P2), and changes the read management flag from 0 to 1 (state I to state II).

b. If the write management flag is 0, and the read management flag is 1 (state II), the read cache driver 50 returns data read out from read cache data in response to a read request signal from the OS or the like 40.

c. If the read cache driver 50 receives a write request signal, it does not use read cache data. The read cache driver 50 always passes a read request signal from the OS 40 side to the downstream filter driver 46, delegates subsequent processing of the read request signal to the downstream filter driver 46, and changes the write management flag from 0 to 1 (state II to state III). If writing is performed on an area on which reading has never been performed since OS has been booted, of the read management flag and the write management flag of 0, only the write management flag is changed to 1 (state I to state IV). If the write management flag is 1 (state III and state IV), read cache data should not be used.

d. If image data on the server side has been updated, if cache data has been corrupted, or in other cases, the read management flag and the write management flag are both changed to 0.

[5] Advantages of This System

With the above-described configuration, if there are a large number of client terminals which have performed a network boot once, the client terminals each can be booted not via a network but using cache data in the local disk for a second or subsequent time. Accordingly, network loads can be dramatically reduced.

In particular, even if a large number of clients with cache data are simultaneously booted, there is almost no network access, and every client can be booted at a comparable speed to its local disk. As a result, the number of client terminals which can be connected to one server can be significantly increased. Sectors for which writing is performed are excluded from caching, and pieces of read cache data for sectors except for the excluded sectors are saved until after OS rebooting. Accordingly, the more often client terminals are used, the more network loads are reduced.

Additionally, since the cache in this system is a cache specialized for reading, if reading of data is unsuccessful, e.g., in the event of a hard disk failure, the client terminal is booted by a network boot using a virtual disk image. Accordingly, the client terminal can also operate as a conventional diskless terminal.

If a swap area, a work area for application software, and a write cache area are separately reserved in addition to a read cache area, each client terminal operates more comfortably.

Modification of First Embodiment

Figure 5:
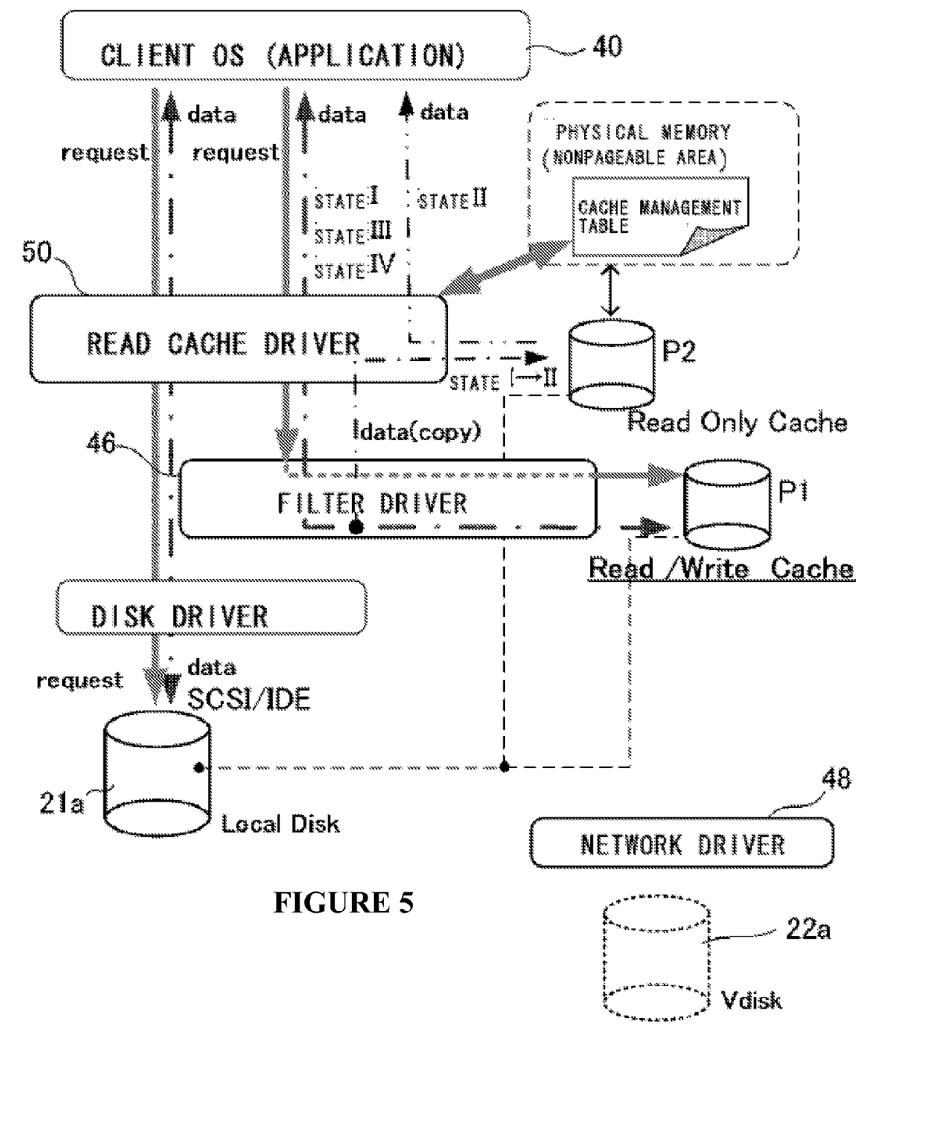
FIG. 5 shows a modification of the first embodiment and is a diagram for explaining a disk access relationship in a system according to the modification which principally uses a read cache and secondarily uses a write cache.

FIG. 5 shows a modification of the first embodiment and is a diagram for explaining a disk access relationship in a system according to the modification which principally uses a read cache and secondarily uses a write cache. In this case, the system can respond to the OS side with information on writing using a write cache provided in a local disk without network access. The configuration is specific to the system and has an extraordinary effect, as described above.

Studies by the present inventors have shown that the operating speed of each client terminal is extremely slower as compared to a case where only a write cache is used (examples of this case include one where a write cache is placed on the server side and one where a write cache is placed on each local disk). Reasons for this slowness require long explanation, and the slowness is mainly due to the influence of write latency. That is, the problem of a reduction in read rate with an increase in the number of clients cannot be resolved only with a write cache.

Second Embodiment

Encryption of Each Partition

A virtual disk whose real storage is present on the server side has few security problems. However, storage of read cache data or write cache data in a local disk (physical disk) directly connected to a client terminal, i.e., on the client terminal side may constitute a security vulnerability in a network boot system characterized by managing data in a centralized manner on the server side. In the light of the fact that a first partition of a physical disk is recognized as a drive on an OS, the drive or the whole disk is desirably encrypted. Second and third partitions of the physical disk are treated at a sector or cluster level, and the need for encryption is less than the first partition. However, the second and third partitions are preferably encrypted, e.g., in preparation for the case where the local disk and all are stolen.

A network boot system according to the present invention can significantly reduce network loads and dramatically increase the number of client terminals which can be connected to one network boot server. Since changes only need to be made to a part of each client terminal, even an existing server or diskless terminal can be continuously used. As described above, the industrial applicability of implementation of the present invention is extremely high.

FIG. 1(B)
1 DATA
FIG. 2
40 CLIENT OS (APPLICATION)
46 FILTER DRIVER
48 NETWORK DRIVER
50 READ CACHE DRIVER
1 STATE
2 PHYSICAL MEMORY (NONPAGEABLE AREA)
3 CACHE MANAGEMENT TABLE
4 DISK DRIVER
FIG. 3(C)
1* P2 AND P3 ARE INVISIBLE FROM OS
FIG. 4(A)
1 CACHE MANAGEMENT TABLE
2 TYPE OF STATE FLAG
3 VALUE OF STATE FLAG
4 READ MANAGEMENT FLAG
5 NOT READ YET
6 ALREADY READ
7 WRITE MANAGEMENT FLAG
8 NOT WRITTEN YET
9 ALREADY WRITTEN
FIG. 4(B)
1 PROCESSING OF READ REQUEST SIGNAL
2 STATE
3 OPERATION
4 CACHE DATA UNAVAILABLE (NO DATA)
5 CACHE DATA AVAILABLE
6 CACHE DATA UNAVAILABLE (DATA HAS BEEN UPDATED)
7 CACHE DATA UNAVAILABLE (WRITING HAS BEEN ALREADY PERFORMED)
FIG. 5
40 CLIENT OS (APPLICATION)
46 FILTER DRIVER
48 NETWORK DRIVER
50 READ CACHE DRIVER
1 STATE
2 PHYSICAL MEMORY (NONPAGEABLE AREA)
3 CACHE MANAGEMENT TABLE
4 DISK DRIVER
FIG. 6(A)
101 OS (APPLICATION)
 102 DISK DRIVER
FIG. 6(B)
104 CLIENT OS (APPLICATION)
106 FILTER DRIVER
107 NETWORK DRIVER

What is claimed is:

1. A network boot system wherein
a network boot server which provides an operating system operating on a client terminal and a client terminal including a physical storage device are connected to each other over a network,
the storage device including a read cache area;
the client terminal including a physical memory configured to temporarily store data necessary during boot-up of the operating system and a network interface for accessing the server over the network,
the operating system including
a network driver for driving the network interface, a filter driver for converting access to a local bus of the client terminal into access to the network, and a read cache driver for driving the storage device,
wherein the read cache driver is configured to receive a read request signal from the client terminal and then store data read by the filter driver to the read cache area as read cached data; and
wherein the read cache driver is configured to receive a write request signal to the read cache area, whereby the physical memory is configured in response to store an indicator that the write request signal has been received, and whereby the read cache driver is configured to not use the read cached data of the read cache area.

2. The network boot system according to claim 1, wherein the client terminal holds, in the physical memory, a management flag for determining by the read cache driver whether the data read out from the server is in an already-written state, and wherein the read cache area is configured to hold data received from the server.

3. The network boot system according to claim 1, wherein the client terminal holds, in the physical memory, a management flag for determining by the read cache driver whether the data read out from the server is in an already-written state, and
the storage device includes a cache management area for writing back at least a part of the management flag held in the physical memory;
wherein the read cache area is configured to hold data received from the server.

4. The network boot system according to claim 1, wherein the storage device includes a swap area for temporarily storing a part of data stored in the physical memory.

5. The network boot system according to claim 1, wherein the storage device includes a write cache area where data written to the server is allowed to be stored.

6. The network boot system according to claim 1, wherein the storage device includes a work area for application software operating on the operating system.

7. The network boot system according to claim 1, wherein the server comprises a virtual disk for holding an operating system, application software, and other data used by the client terminal, the virtual disk including an area for holding update information for the virtual disk, and if the virtual disk is updated, all pieces of data cached in the storage device are not used.

8. The network boot system according to claim 1, wherein a part or a whole of the storage device is encrypted.

* * * * *